United States Patent
Whiting

Patent Number: 5,414,850
Date of Patent: May 9, 1995

[54] SYSTEM FOR TRANSPARENTLY COMPRESSING DATA FILES IN A COMPUTER SYSTEM

[75] Inventor: Douglas L. Whiting, Carlsbad, Calif.

[73] Assignee: STAC Electronics, Inc., Carlsbad, Calif.

[21] Appl. No.: 748,978

[22] Filed: Aug. 23, 1991

[51] Int. Cl.[6] .............................................. G06F 12/02
[52] U.S. Cl. ..................................... 395/700; 364/200; 364/222.81; 364/DIG. 1; 364/900; 364/955; 364/DIG. 2
[58] Field of Search ................ 395/700, 200, 275, 650; 364/200, 900; 341/51

[56] References Cited

U.S. PATENT DOCUMENTS 4,982,324  1/1991  McConaughy et al. ............. 395/200

OTHER PUBLICATIONS

Bryan Pfaffenberger, Ph. D., Que's Computer User's Dictionary, 1992, pp. 369, 251.
"Data compression doubles capacity of 0.25-inch tape drives" by Seither, Nike, Systems Integration May 1989, 22n5 p. 26(5).
"Two DAT data compression methods are likely to emerge" by Krohn, Nico, Info World Sep. 10 1990 v12 n37 p. 32(1).
"DOS improvement Kit" by Van Kirk, Doug. PC-Computing Nov. 1989 v2 n11 p. 123(3).
"Squish Plus: good compression" by Schindler, Paul E., Jr. PC Week Apr. 10 1989 v6 n14 p. 96(1).
"The big squeeze" by Price, Mike, PC User Apr. 25 1990 n131 p. 66(5).
"Tape-drive Vendors choose data-compression standards" by Sullivan, Kristina B. PC Week Jul. 16 1990 v7 n28 p. 17(2).
"New Stac data-compression product performs well without affecting PC" by Claiborne, David, PC Week Dec. 17 1990 v7 n50 p. 20(2).
"Storage: real-time compression from Stac Electronics for DOS based systems" EDGE: Work-Group Computing Report Oct. 29 1990 v1 n23 p. 5(1).
"New storage space for hard disks" by Mendelson, Edward, PC Magazine Jun. 27 1989 v8 n12 p. 48(1).
"Squish Plus squeezes data into cramped stroage spaces" by Glass, Brett, PC-Computing Jul. 1990 v3 n7 p. 62(1).
"Get more out of your hand disk with cost-effective squish plus" by Angus, Jeff, Info World Mar. 6, 1989 v11 n10 p. 50(1).
"The big squeeze" by Johnson, Johna Till, Personal Computing Jun. 29, 1990 v14 n6 p. 139(3).

Primary Examiner—Kevin A. Kriess
Assistant Examiner—Michael T. Richey
Attorney, Agent, or Firm—Irell & Manella

[57] ABSTRACT

A data compression device driver compresses and decompresses files on a disk drive in a computer system when a user copies files from a drive letter assigned to the disk drive to a drive letter assigned to the data compression device driver. Drive parameter blocks for the disk drive and for the data compression device driver contain the assigned drive letter, disk geometry information, a rebuild flag, and a pointer to the device driver. A swapping means swaps the device driver pointers in the drive parameter blocks corresponding to the disk drive and the data compression device driver. From then on, compressed data files may be accessed transparently by using the drive letter which was originally assigned to the disk drive before swapping, which now refers to the data compression device driver.

7 Claims, 1 Drawing Sheet

SYSTEM FOR TRANSPARENTLY COMPRESSING DATA FILES IN A COMPUTER SYSTEM

FIELD OF THE INVENTION

The present invention relates to a system for maintaining compressed data files on a disk within a computer system so that a user may use the compressed data files as if they were uncompressed. More particularly, the present invention relates to a system for swapping assigned drive letters for drivers within an operating system.

BACKGROUND OF THE INVENTION

MS-DOS is by far the most commonly used personal computer operating system in the world. Under MS-DOS, disk drives are assigned identifying drive letters from "A" to "Z." Data files located on disk drives are referenced using an assigned drive letter, a directory path name, and a file name. For example, a file may have the name "C: DIRNAME FILENAME." The drive letter ("C") and the directory name ("DIRNAME") may have default values which need not be specified in a given instance. Many books have been written to explain the MS-DOS operating system to users, and thousands of software utilities exist to help users to copy, delete, move, modify and search files within MS-DOS.

Data compression is a well-known technique for making efficient use of space on data storage devices. Several techniques are known in the art for adding data compression capability to a data storage device in an MS-DOS system. One technique involves compressing an entire file when it is closed, and decompressing the entire file when it is opened and before it is accessed. The key problem with this technique is that when accessing a relatively small portion of a large file, the entire file must be decompressed for accessing, and then fully compressed for saving. This can result in a serious degradation in system performance. In addition, the file size given by the directory listing utility is the compressed file size, which is not the same as the decompressed size. Thus, this technique is not transparent to the user.

Another technique known in the art is to use an entire disk drive, starting when the system is booted, and decompressing and compressing the files as required. Portions of the files are compressed and decompressed to avoid the performance degradation of the first approach, and the disk is presented to MS-DOS as a standard disk. The key problem with this technique is that there is no standard architecture for creating compressed disk drives in this manner, which can lead to incompatibilities with standard disk utility programs. An additional problem is that if the system is started without the compression disk drive being present, the disk will not be recognized by MS-DOS. Data corruption will result if any attempt is made to write to the disk.

An additional technique known in the art uses a well-defined MS-DOS method for providing new drive letters to the system. Known as "installable device drivers," the architecture for this method is clearly defined in the MS-DOS specification and is followed by almost all disk drive manufacturers. To implement data compression, instead of adding a new physical disk drive with an accompanying device driver, this technique reserves a portion of an existing disk drive by creating a large file, known as a Compressed Disk Image File (CDIF), on the drive. A data compression device driver is assigned a new drive letter by MS-DOS. The data compression device driver is called by accessing files with the device driver's assigned drive letter. The device driver performs all data compression and decompression transparently, with all disk accesses physically performed within the CDIF. Data compression device drivers created in this manner present a transparent compressed disk drive to the user. Further, if the system is ever booted without the data compression device driver, the physical drive is still a normal MS-DOS disk drive that simply contains the CDIF as a file, so there is no danger of data corruption.

Although this technique has a major compatibility advantage, a significant disadvantage is that the drive letter for the newly defined CDIF, such as "D," may be inconvenient to the user. For example, if all of a user's data is stored on an original physical disk drive "C," after installing a data compression product that uses this approach, there will be a drive "C" and a newly defined drive "D." Thus, even after a user copies files over from drive "C" to drive "D," which is typically accomplished during installation of the data compression driver and results in compression of the files that are copied, the user would then have to change all references to drive letter "C" in each of the user's programs and batch files from "C" to "D" in order to reference the newly copied (and compressed) files. This results in a significant annoyance to the user and is a departure from the user's normal work procedure.

Thus, there is a need for a data compression approach which allows for compression of files in a manner which is completely transparent to users, does not result in degradation of performance, and does not require any alteration of existing programs or batch files.

SUMMARY OF THE INVENTION

In view of the foregoing, it is an object of the present invention to provide a method and apparatus which allows data file compression with maximum compatibility but without requiring a user to change references to drive letters in existing programs and batch files.

It is a further object of the present invention to provide a method and apparatus which allows the use of data files on a disk, regardless of whether a data compression device driver is present.

The present invention relates to a system for maintaining compressed data files on a disk drive in a computer system so that a user may access data files as if they were uncompressed. The computer system has an operating system which assigns a drive letter to the disk drive. The operating system also assigns a drive letter to a data compression device driver. The data compression device driver compresses and decompresses files on the disk drive when the user copies files from the drive letter assigned to the disk drive to the drive letter assigned to the data compression device driver. The operating system maintains drive parameter blocks relating to each drive as entries to a table. Each drive parameter block contains the assigned drive letter, geometry information about the drive, a rebuild flag, and a pointer to the device driver. After initialization of the table, a swapping means swaps the device driver pointers in the drive parameter block of the disk drive and the drive parameter block of the data compression device driver in the table and sets the corresponding rebuild flags. From then on, compressed data files may be accessed transparently by using the drive letter which was originally assigned to the disk drive before swapping, which now refers to the data compression device driver.

DETAILED DESCRIPTION OF THE PREFERRED EMBODIMENT

The present invention uses the above-described, widely used MS-DOS method for providing drive letters to a device driver, known as "installable device drivers."

Figure 1:
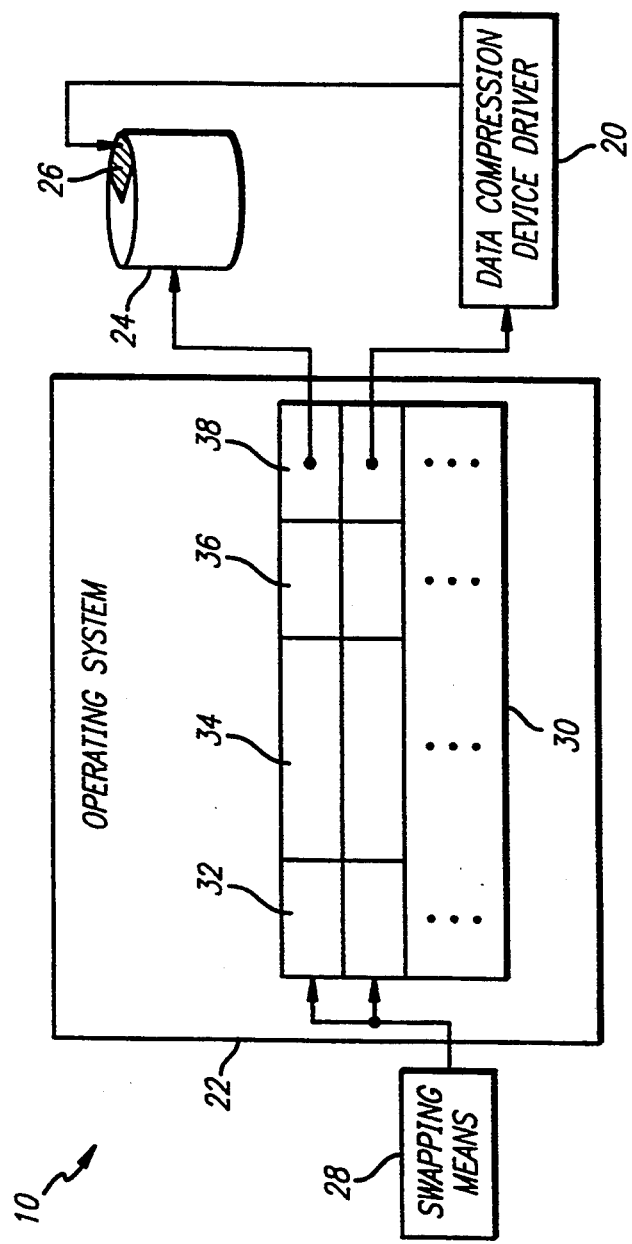
FIG. 1 is a block diagram of a computer system constructed in accordance with the preferred embodiment of the present invention.

FIG. 1 is a block diagram of a computer system 10 constructed in accordance with the preferred embodiment of the present invention. Computer system 10 includes a data compression device driver 20, an operating system 22, a disk drive 24, and a swapping means 28. Data compression device driver 20 compresses files to be stored on disk drive 24, and decompresses portions of stored files when they are accessed. All accesses to the compressed files are performed through data compression device driver 20.

During initialization of the computer system 10 (known as "boot-up"), operating system 22 assigns drive letters to disk drive 24 and data compression device driver 20, typically drive letter "C" for the former and drive letter "D" for the latter. Operating system 22 also maintains a table 30 of the assigned drive letters, with each entry of the table having a drive letter field 32 containing the assigned drive letter. Each entry of table 30, known as a "Drive Parameter Block," also includes a field 34 for storing disk geometry information, a rebuild flag field 36, and a pointer field 38 containing a pointer to the corresponding device driver. When a file access is requested, operating system 22 uses the corresponding Drive Parameter Block information to calculate which disk sectors to access, and then instructs the corresponding device driver to locate and access the file. If a rebuild flag, within the rebuild flag field 36, for the accessed Drive Parameter Block is set, operating system 22 re-reads the disk and rebuilds disk geometry information in disk geometry information field 34 prior to file access.

Disk drive 24 stores both compressed and uncompressed files. Compressed files are stored in a dedicated portion of disk drive 24 called a Compressed Image Data File (CDIF) 26. CDIF 26 is accessed using the drive letter assigned to data compression device driver 20. Files are compressed and decompressed by data compression device driver 20 by transferring the files to and from, respectively, CDIF 26 by using the drive letter assigned to data compression device driver 20. Thus, data compression device driver 20 performs data compression and decompression transparently, with all disk accesses physically occurring within CDIF 26.

Swapping means 28 is used to swap the drive letters assigned to disk drive 24 and to data compression device driver 20. Swapping means 28 first makes calls to operating system 22 for pointers to the Drive Parameter Blocks for disk drive 24 and data compression device driver 20. Such calls within MS-DOS are described in detail in numerous references, such as in T. Dettman, *DOS Programmer's Reference* at 559–61, 577–78 (2d ed. 1989), which is incorporated herein by reference. Swapping means 28 then swaps the corresponding device driver pointers within device driver pointer fields 38 of the corresponding Drive Parameter Blocks, and sets the corresponding rebuild flags in the rebuild flag field 36. This swapping occurs during boot-up of computer system 10, if so commanded by the user, after operating system 22 assigns drive letters to disk drive 24 and to data compression device driver 20.

In some operating systems, such as earlier versions of MS-DOS, when the rebuild flag is set, the rebuilding of the Drive Parameter Block may not be performed completely. In such cases, swapping means 28 swaps fields in addition to the device driver pointer fields 38 in the Drive Parameter Blocks. Swapping means 28 swaps those additional fields which should be changed by the proper rebuilding of table 30 by operating system 22.

Figure 2:
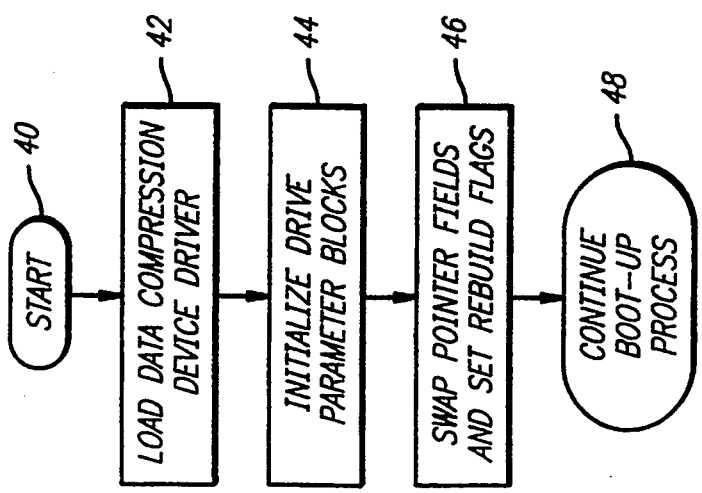
FIG. 2 is a flow chart showing the major steps for initialization of a computer system constructed in accordance with a preferred embodiment of the present invention.

FIG. 2 is a flow chart of the major steps for initialization ("boot-up") of computer system 10. Computer system 10 is initialized every time the power is turned on, and may be initialized at other times also. The boot-up process begins at step 40. Processing then continues at step 42 where data compression device driver 20 is loaded from disk drive 24. Processing then continues at step 44, where drive letter field 32, disk geometry information field 34, device driver pointer field 38, and rebuild flag field 36 of the Drive Parameter Blocks of table 30 are initialized. Processing then proceeds to step 46 where swapping means 28 is called so that the contents of device driver pointer fields 38 of table 30 corresponding to disk drive 24 and data compression device driver 20 are swapped, and rebuild flags are set in the corresponding Drive Parameter Blocks for the drives. The boot-up process then continues at step 48.

The swapping operation is usually arranged to start immediately after the data compression device driver is loaded, so that all subsequent file references to drive "C" during the boot process can be on the compressed drive. However, in an alternative embodiment, the user may be permitted to manually activate the swapping operation at any time after data compression device driver 20 is loaded.

While preferred examples of the present invention have been shown and described, it should be understood that modifications may be made by those skilled in the art without departing from the invention principles herein disclosed. For example, the computer system 10 may include a plurality of disk drives and more than one data compression device driver. Therefore, the appended claims are intended to cover all such modifications that fall within the spirit and scope of the invention.

What is claimed is:

1. A method for maintaining compressed data files on a disk drive in a computer system so that a user may access said data files as if they were uncompressed, said disk drive having a drive letter assigned by an operating system, said operating system storing with said assigned drive letter a device driver pointer to said disk drive, said method comprising:

compressing and decompressing one or more files on said disk drive with a device driver, said compressing and decompressing device driver having a drive letter assigned by said operating system, said operating system storing with said assigned drive letter for said compressing and decompressing device driver a device driver pointer to said compressing and decompressing device driver; and swapping said device driver pointer stored with said drive letter assigned to said disk drive and said device driver pointer stored with said drive letter assigned to said compressing and decompressing device driver.

2. The method of claim 1 wherein said disk drive comprises a first portion referenced directly by said drive letter assigned to said disk drive and a second portion referenced through said compressing and decompressing device driver by said drive letter assigned to said compressing and decompressing device driver, said first portion for storing said data files uncompressed and said second portion for storing said data files compressed.

3. The method of claim 2 wherein said operating system maintains a table containing a drive parameter block for storing information regarding each of said first and said second portions of said disk drive, each of said drive parameter blocks containing said information including said assigned drive letter, said device driver pointer, disk geometry information, and a rebuild flag.

4. The method of claim 3 further comprising compressing data files before storing said data files on said second portion of said disk drive, and decompressing data files before accessing said data files from said second portion of said disk drive.

5. The method of claim 3 wherein said swapping step further comprises swapping information in addition to said device driver pointer in said drive parameter blocks corresponding to said first and second disk portions.

6. The method of claim 3 wherein said swapping step further comprises setting said rebuild flags in said drive parameter blocks corresponding to said first and second disk portions.

7. A method for maintaining compressed data files on a disk drive in a computer system so that a user may access said data files as if they were uncompressed, said disk drive having a drive letter assigned by an operating system, said method comprising:

compressing and decompressing one or more files on said disk drive with a device driver, said compressing and decompressing device driver having a drive letter assigned by said operating system; and swapping said drive letter assigned to said disk drive and said drive letter assigned to said compressing and decompressing device driver.

* * * * *